US006332050B1

United States Patent
Feldman et al.

(10) Patent No.: US 6,332,050 B1
(45) Date of Patent: Dec. 18, 2001

(54) OPTICAL SLAB WAVEGUIDE FOR MASSIVE, HIGH-SPEED INTERCONNECTS

(75) Inventors: Martin Feldman; Ahmed A. El-Amawy; Ramachandran Vaidyanathan, all of Baton Rouge, LA (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 0 days.

(21) Appl. No.: 09/543,617

(22) Filed: Apr. 5, 2000

(51) Int. Cl.[7] ............................... G02B 6/28; H04J 14/02
(52) U.S. Cl. .................. 385/24; 385/1; 385/11; 385/15; 385/27; 385/28; 385/47; 385/129; 385/130; 385/131; 359/115; 359/116; 359/124; 359/130; 359/135; 359/129
(58) Field of Search ..................... 385/1, 2, 3, 4, 385/5, 14, 15, 24, 27, 28, 47, 129, 130, 131, 11; 359/115, 116, 122, 123, 124, 127, 129, 130, 135, 137, 138

(56) References Cited

U.S. PATENT DOCUMENTS

| 4,516,828 | * | 5/1985 | Steele ................................. 385/24 X |
| 4,701,012 | * | 10/1987 | Kaiser ................................ 385/24 X |
| 4,744,617 | * | 5/1988 | Hvezda et al. .................... 385/24 X |
| 4,786,131 |   | 11/1988 | Mahapatra et al. ................ 385/24 X |
| 4,824,200 | * | 4/1989 | Isono et al. ........................ 385/24 X |
| 4,872,739 | * | 10/1989 | Kahn et al. ........................ 385/24 X |
| 5,005,935 | * | 4/1991 | Kunikane et al. ................. 385/24 X |
| 5,477,363 | * | 12/1995 | Matsuda .............................. 359/128 |
| 5,894,539 |   | 4/1999 | Epstein ................................ 385/133 |
| 6,031,952 | * | 2/2000 | Lee ......................................... 385/47 |
| 6,055,099 | * | 4/2000 | Webb ................................. 384/24 X |
| 6,188,816 | * | 2/2001 | Solheim ................................. 385/24 |
| 6,201,908 | * | 3/2001 | Grann ..................................... 385/24 |
| 6,212,312 | * | 4/2001 | Grann et al. .......................... 385/24 |
| 6,236,778 | * | 5/2001 | Laughlin ............................... 385/24 |

OTHER PUBLICATIONS

Feldman, M. et al., "High speed, high capacity bused interconnects using optical slab waveguides," *Proc. Workshop on Optics in Comp. Sci.*, Lecture Notes in Computer Science, vol. 1586, pp. 924–937 (1999).

Feldman, M. et al., "Optical slab waveguides for massive, high-speed interconnects within a small confine," Proposal submitted to National Science Foundation (Feb. 2000).

* cited by examiner

*Primary Examiner*—Brian Healy
(74) *Attorney, Agent, or Firm*—John H. Runnels

(57) ABSTRACT

Optical slab waveguides are used as high-speed, high-capacity interconnects for parallel or other devices. Optical slab interconnects can connect to many more elements than can conventional electrical or fiber optic buses. A multiplexing scheme called "mode division multiplexing" greatly increases the number of independent channels that a single slab can support. Optical slab waveguides have a potential capacity of over one million independent channels, each channel operating at 1 GHz in a single physical medium, with each channel capable of receiving input from over 1000 ports and sustaining a load of over 1000.

33 Claims, 6 Drawing Sheets

OPTICAL SLAB WAVEGUIDE FOR MASSIVE, HIGH-SPEED INTERCONNECTS

This invention pertains to optical slab waveguides that may be used as high-capacity interconnection devices, for example as a bus or other interconnection device in a massively parallel computing environment.

Interconnection devices are essential components in computer systems and other types of electronics. Existing uses for interconnection devices include connections within processors, connections on a board, and backplanes connecting boards and global shared buses in multiprocessor systems.

A bus is one type of an interconnection device. As interconnection devices, buses have several desirable features. When used as a shared resource, a bus can be used more efficiently and flexibly than dedicated connections. Bus-based systems support broadcasting easily and naturally, and have reasonable costs.

There are limits on the number of connections that may be made to electrical buses. The "loading" of a bus refers to the maximum number of connections that can be made to the bus without significantly degrading signal quality. Connections to an electrical bus cause capacitive loading that limits the rate at which the signal switches states reliably (i.e., the bus clock rate). In addition, crosstalk problems can arise from the close proximity of high frequency signals in adjacent buses. Using state-of-the-art technology, an electrical bus operating at a few hundred MHz can only support a loading of about 30 different connections. A fiber optic bus can connect to a somewhat larger number of elements (about 100 at a few hundred MHz), a loading that is still inadequate for moderately large systems.

U.S. Pat. No. 5,894,539 discloses a light pipe for illuminating a billboard or similar-type display. The light pipe was said preferably to have a rectangular, e.g., square, cross-section, to preserve the modes emitted from a point light source, i.e., the cone of emission from the light pipe was about the same as that from the light source. In one embodiment, the light pipe had a plurality of notches in the surface of the light pipe opposite the direction that light rays from a point light source were directed by the light pipe, i.e., opposite to the side of the light pipe adjacent to the display. Notches in the surface of the light pipe preferably formed an angle of about 45 degrees. The pitch, i.e., frequency, of the notches was preferably non-uniform to improve the uniformity of illumination from one end of light pipe to the other. An increasing density of notches was said to compensate for the drop in luminous flux density as light was removed from the light pipe proceeding away from the point light source. In an alternative embodiment, the light pipe was wedge-shaped and had a plurality of step-facets which extracted light from the pipe and directed it out the opposite side of the light pipe. The preferred angle of the step facets was about 45 degrees.

U.S. Pat. No. 4,786,131 discloses an M×N coupler using a planar waveguide to couple each of M input channel waveguides to each of N output channel waveguides, the input guides and the output guides being disposed on opposite sides of the planar waveguide. Uniformity of coupling was said to be improved by joining the input channel waveguides to the planar waveguide in a manner to focus the beams emitted by each input guide into the planar waveguide at a common focal point located near the center of the edge where the output guides join the planar waveguide.

We have discovered a novel interconnection device based on an optical slab waveguide. Unlike optical fibers that have a single transmission mode, or at most a small number of modes, the novel slab interconnects can support several thousands of modes simultaneously. The novel slab interconnects have greatly increased capacity as compared to existing interconnects. A single slab waveguide can admit thousands or even millions of independent channels. In a busing environment, each of these channels can be capable of supporting a loading as high as 1000 (or even more). A novel scheme that we have named "mode division multiplexing," when used in conjunction with another multiplexing scheme such as wavelength division multiplexing, achieves channel densities, communication bandwidths, and flexibility that are unmatched by any existing technology. For example, a single slab waveguide, about 11 centimeters long and about 5 $mm^2$ in cross section, can accommodate around one million independent channels, each operating at 1 GHz. Moreover, each of these million channels can mix information from each of around 1000 inputs, and can be accessed from each of around 1000 outputs. These properties give the slab interconnect tremendous flexibility. The implications of this discovery are potentially huge, encompassing on-chip communications, chip-to-chip communications, multiprocessor interconnection networks, and many other applications. The communication environments that could benefit are wide-ranging as well, including one-to-one, many-to-many, and many configurations in between. Speeds even higher than 1 GHz are possible, especially on smaller slabs or with a smaller number of channels. "Mode division multiplexing," an important feature of the new invention, is possible neither on optical fibers, nor on conventional electrical interconnects. Optical slab waveguides offer a new system that could push the limits of in-system communications within a small confine, and could motivate new architectures and applications that range from on-chip/board-level interconnects and multiprocessor interconnection networks, to network servers and communication equipment. They will also be useful in addressing holographic memories.

As used in the specification and Claims, the term "slab" denotes a waveguide for which the dimensions of the cross section are substantially larger than the wavelength of the light. In addition, unlike a fiber, a slab waveguide can transmit light in many different modes. The term "fiber" refers to waveguides that permit only a single mode (or at most a few modes).

BRIEF DESCRIPTION OF THE DRAWINGS

FIGS. 10(*b*) and (*c*) illustrate two of numerous possible interconnection patterns.

Much previous work on optical interconnects has centered on optical fiber communication. Many of the considerations important to long-haul optical fiber communications are not relevant to communication between proximate devices using the novel slab waveguide. To operate over long distances at high frequencies, optical fibers are designed to have minimal attenuation, typically less than about 1 db/kilometer, and minimal dispersion. The very low attenuation and dispersion required for transmission over many kilometers are not important when linking devices at most a few meters apart through the novel slab waveguide. Moreover, low dispersion in optical fibers has usually been obtained by restricting the fibers to single mode operation. Single mode operation typically uses laser diode transmitters for efficient light coupling to the fiber. However, if the signals from several fiber inputs are passively coupled or fed into a single fiber (as in a bus), most of the available power will be reflected. The optical power that is carried by a single mode fiber cannot be increased by increasing the number of sources. Not only does this limitation seriously reduce the power available in many optical bus configurations, it also couples some of the power back into the lasers that emitted the light. This unwanted feedback can cause instabilities in the operation of the lasers.

Free-space optical systems have also been used as interconnects in parallel computing systems. In a typical free-space optical system, lenses image a series of arrays of light emitting diodes or lasers onto matching arrays of photodetectors. These free-space systems are capable of carrying a large amount of data. In addition, using "smart pixels" it is possible to perform limited processing locally between neighboring pixels. Processing can also be performed in additional optical components such as liquid crystal arrays or acoustooptic modulators inserted in the optical path. However, free-space optical systems have limited applications as buses, where light from each of the input sources is broadcast to all of the detectors.

We report some preliminary results with an embodiment that employs a novel slab waveguide as a prototype interconnect, and a comparison to existing technology. A single-mode fiber optic bus can support a loading of only about 100 at data transfer rates on the order of 1 GHz. Slab interconnects, on the other hand, are capable of connecting to over 1000 elements per channel, at data transfer rates on the order of 1 GHz for each channel. Our novel "mode division multiplexing" scheme may be used in conjunction with conventional methods, such as wavelength division multiplexing, to increase the number of independent channels yet again by a factor of about 1000, i.e., to 1,000,000 channels or more.

Loading Limitation of Fiber Buses

Figure 1:
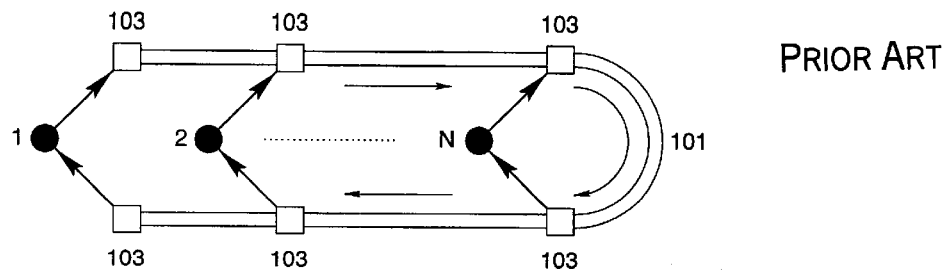
FIG. 1 depicts a typical prior art optical fiber bus.

As depicted in FIG. 1, a typical prior art optical fiber bus contains a U-shaped optical fiber 101 connected by directional couplers 103 to light sources (on one end of the bus) or detectors (on the other end) 1, 2, . . . , N. Normally, directional couplers are used to transfer power from one fiber to another, while the direction of information flow along the fibers remains the same. The fraction of power transferred between the fibers (the "coupling factor") is a parameter of the directional coupler. To ensure that all detectors receive the same amount of power (regardless of the transmitting light source), different couplers use different coupling factors. Moreover, with single-mode fibers if one unit of power is transmitted by one of N sources, then each of N detectors receives at most $$\frac{1}{N^2}$$

units of power.

This inefficient power distribution limits the loading, or the maximum number of detectors that may be connected to the bus. It may be shown that at a 1 GHz data transmission rate, the maximum loading for fiber buses is about 100. The power carried by a fiber cannot be increased simply by adding more inputs.

Slab Waveguides

Disregarding the ports, in a preferred configuration the slab should have a rectangular cross section to preserve the collimation of light, so that light beams entering the slab at different angles exit the slabs at different angles (with the understanding that light entering at one angle can exit at ± the nominal exit angle); i.e. (aside from the ± aspect), there is a 1-to-1 correspondence between input angles and exit angles; put differently, there is a 1-to-1 correspondence in the magnitude of the input angles and the magnitude of the output angles (where "magnitude" means the absolute value of the angle with respect to a reference plane). Note that the rectangular cross-section need not be a constant cross section; while it may be constant, it can also be stepwise constant (as in the "sawtooth" waveguide), or even some other shape with a varying rectangular cross section, such as a truncated pyramid, so long as the relative angular separation of light entering the waveguide at different angles is preserved as light exits the waveguide. Alternatively, two of the sides may be sufficiently far apart (or sufficiently absorbing) that reflections from those two sides are effectively not transmitted; then the cross-section in this preferred configuration need not be rectangular, provided that the remaining two sides are reflecting, and are parallel to one another. In addition, it is preferred that light from all inputs should be able to reach all outputs.

It can be shown that the number of modes, m, that may be transmitted in the plane of a slab of width d is given by $$m = \frac{2d}{\lambda}\sqrt{(n^2-1)}$$

where n is the index of refraction of the slab in air, and λ is the wavelength of the light. For slabs in which d is equal to a few mm, using visible light, m is on the order of several thousand. In sharp contrast with optical fibers, the total power carried by a slab can be proportional to the number of sources (so long as the number of sources does not exceed the number of available modes).

In a slab bus with an appropriate geometry, it is possible to divide the power from a laser diode or LED equally among all detectors (in the approximation of no transmission losses and no insertion losses). That is, if the light source transmits one unit of power, then each of N detectors receives 1/N units of power (compared to $1/N^2$ for a single-mode fiber). This distribution directly translates to a larger loading, better efficiency, and better scalability for broadcast/multicast oriented applications. The loading of a slab bus can be as high as approximately the square of the loading of a fiber bus. Even with the conservative assumption that the transmission efficiency is only 10%, the loading capacity can be around 1000, i.e., a single laser diode can reliably broadcast to around 1000 detectors at 1 GHz, an order of magnitude improvement over fiber buses. In general, the loading capacity is inversely proportional to the data rate per channel. At higher transmission efficiencies, the loading capacity may be even greater.

(The above discussion is premised on the use of sufficiently bright light sources, such as laser diodes, and sufficiently sensitive detectors, for example avalanche diodes. Both are well within the present state of the art. Note that the carrying capacities of both fibers and slabs are improved by brighter light sources and by more sensitive detectors.)

Figure 2A:
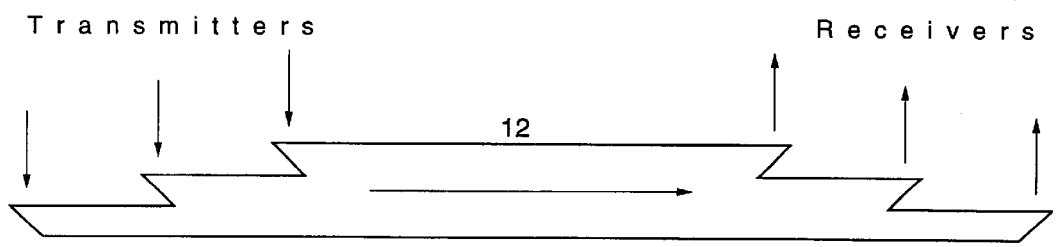
FIGS. 2(a) and 2(b) depict sawtooth slabs in accordance with the present invention.
Figure 2B:
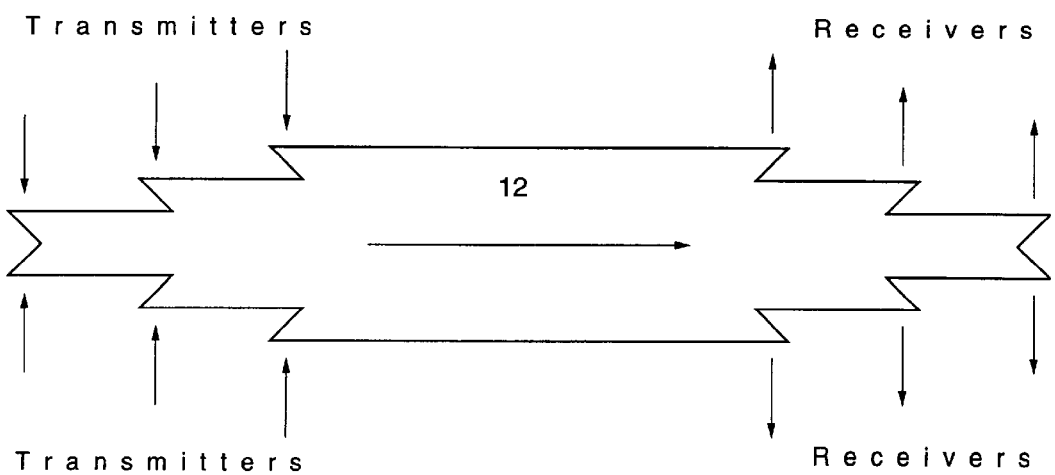
Figure 2C:
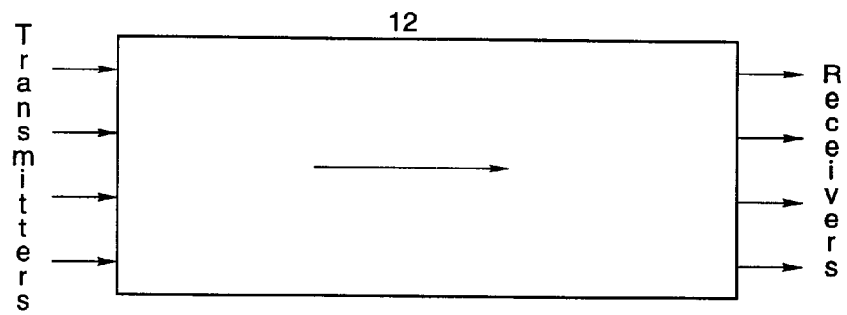
FIG. 2(c) depicts a "bowling alley" slab in accordance with the present invention.
Figure 2D:
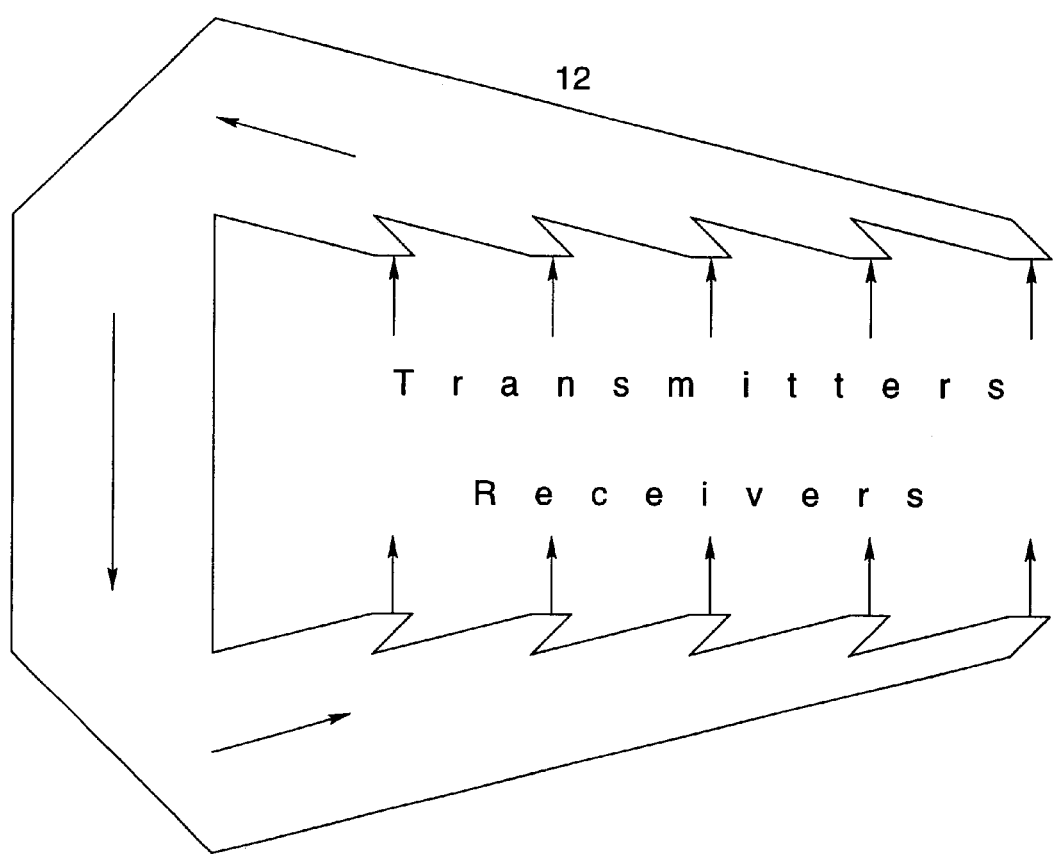
FIG. 2(d) depicts an angled U-shaped slab in accordance with the present invention.
Figure 3A:
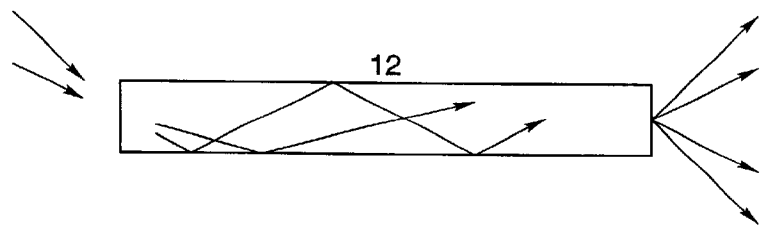
FIGS. 3(a) and (b) illustrate out-of-plane and in-plane modes, respectively.
Figure 3B:
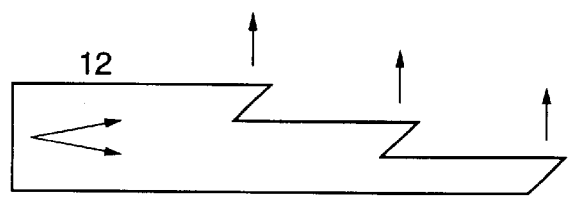

Different slab geometries with different properties may be used in the present invention. A preferred geometry, one with a good signal-to-noise ratio, is a slab having a "sawtooth" shape along one or two sides. See, e.g., sawtooth slab 12 in FIGS. 2(a) and 2(b). With reference to FIG. 3(a), the "plane of the slab" is perpendicular to the plane of the paper; a view in the plane of the slab may sometimes be called the "side view." A view along a direction perpendicular to the plane of the slab will sometimes be called the "top view" (FIG. 3(b)). Other possible geometries include a "bowling alley" configuration as illustrated in FIG. 2(c), or the angled U-shaped configuration shown in FIG. 2(d). In configurations such as the "bowling alley," note that the various ports can simply be different areas along an edge of the slab; the ports need not always be sections that are demarcated from one another.

In sawtooth slab waveguides light is injected and removed from ports spaced along the side or sides. The port locations could, for example, correspond to the locations of different chips or circuit boards. It is preferred that the minimum distance between the last transmitter and the first receiver be such that no element is "shadowed." The light is nominally divided uniformly between the receivers, with minimal loss and reflection. The sawtooth shape may also be folded, so that each card in a rack may have both a transmitter and a receiver. See, e.g., FIG. 2(d).

It may sometimes be desirable to connect multiple slabs to one another, coupling the input port for one slab (or more than one slab) to an output port (or ports) of a previous slab. Where appropriate, optics would connect the ports so that the modes are preserved. This approach can help separate the detectors from one another so they do not become too crowded.

The transmission modes of light propagating through the slab may be classified into two groups: out-of-plane modes and the in-plane modes. See, e.g., FIGS. 3(a) and (b), illustrating out-of-plane and in-plane modes, respectively. (For simplicity only a portion of the slab is shown.)

For the in-plane modes, the propagation of light is parallel to the plane of the slab, but in general is not collimated within that plane. For the out-of-plane modes, by contrast, the light is collimated, but its propagation is not necessarily parallel to the plane of the slab. Of course, most modes have both in-plane and out-of-plane components.

The in-plane multimode capacity of the slab waveguide is useful in mode mixing, so that the energy from each of the transmitters is more-or-less uniformly distributed among the receivers. It is preferred that the slab waveguide have minimal delay, dispersion, and echo. ("Echo" is light that does not reach a detector by a direct path, but instead only after a relatively long delay, possibly interfering with the signal from a subsequent transmission on the same channel.)

Although we have not yet measured echo in the novel sawtooth guides, we have observed that the polarization of the propagating light is preserved in the guides. This observation implies that conventional polarization techniques, e.g. double passes through a quarter wave plate, could be used to minimize echoes if necessary. Micromachining, e.g., through the LIGA technique, may be used to improve surface smoothness and to improve the parallelism of the sides of a slab, to reduce effects such as echo and scattering. The LIGA process (a German acronym for lithography, electroforming, and molding) of manufacturing microstructures is well known. See, e.g., A. Maner et al., "Mass production of microdevices with extreme aspect ratios by electroforming," *Plating and Surface Finishing*, pp. 60–65 (March 1988); W. Bacher, "The LIGA technique and its potential for microsystems—a survey," *IEEE Trans. Indust. Electr.*, vol. 42, pp. 431–441 (1995); E. Becker et al., "Production of separation-nozzle systems for uranium enrichment by a combination of x-ray lithography and galvanoplastics," *Naturwissenschaften*, vol. 69, pp. 520–523 (1982). It is desirable to fabricate the edges as accurately as possible by micromachining, since surface roughness and rounding of nominally sharp corners could increase the scattering of light in unwanted directions.

Mode Division Multiplexing

The novel multiplexing scheme, which we have called "mode division multiplexing," substantially increases the number of channels that a single slab can support as compared with prior electrical or optical buses. More than 1000 independent modes can coexist on a single slab. Since each of these modes can, in turn, support other multiplexing schemes, mode division multiplexing can actually increase the total number of channels otherwise available through these other multiplexing schemes (e.g., wavelength multiplexing) by a factor of 1000 or more, i.e., a total number of channels of 1,000,000 or more.

Figure 4:
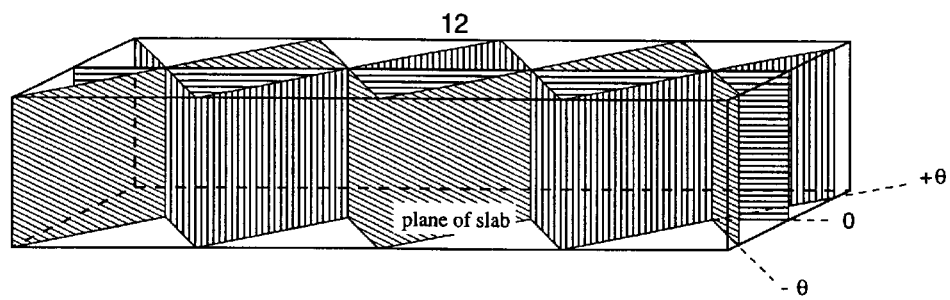
FIG. 4 illustrates three out-of-plane modes schematically.

The in-plane modes and the out-of-plane modes function very differently: the in-plane modes are well-mixed to insure uniform illumination at the detectors, while the out-of-plane modes are well-separated to provide multiple communication channels. See the schematic illustration in FIG. 4, showing three out-of-plane modes. These out-of-plane modes are well-separated as they propagate at different angles to the plane of the slab. In the plane of the slab, the modes are well-mixed.

If light is propagated through the slab waveguide parallel to the plane of the slab, and the output port is perpendicular to this plane, then the light leaving the slab will also be collimated in a direction parallel to the plane of the slab. This is true at each of the slab's multiple exit ports. Additional modes may also be introduced in the slab, in which the light is again collimated, but at various angles to the plane of the slab. Under Snell's Law, the light from these modes exits the slab in a parallel beam at an angle $\theta_{air}$, to the plane of the slab that is given by $$\sin \theta_{air} = n \sin \theta_{slab} \tag{1}$$

where n is the index of refraction and $\theta_{slab}$ is the angle of the beam within the slab.

Because a light beam may undergo either an odd or an even number of reflections within the slab, each mode may exit the slab at both positive and negative angles, even though it may have been excited by light that entered the slab at only a positive angle or a negative angle. These properties have two important consequences: First, light introduced to the slab at various angles maybe detected separately by different detectors, so that multiple channels of communication are possible within the same waveguide. Second, light may intentionally be introduced at both positive and negative angles by different transmitters, and then be detected by a single detector. The latter arrangement permits operation of two transmitters in an "OR" configuration if desired. Also, two or more transmitters at the same angle at different input ports will have a similar "OR" effect. In the analog domain, these effects serve to add two or more signals. Note also that a mirror may be used to fold the light exiting the slab, so that light exiting at both positive and negative angles may be detected by a single detector for each mode. (See, e.g., FIG. 6.)

Figure 5:
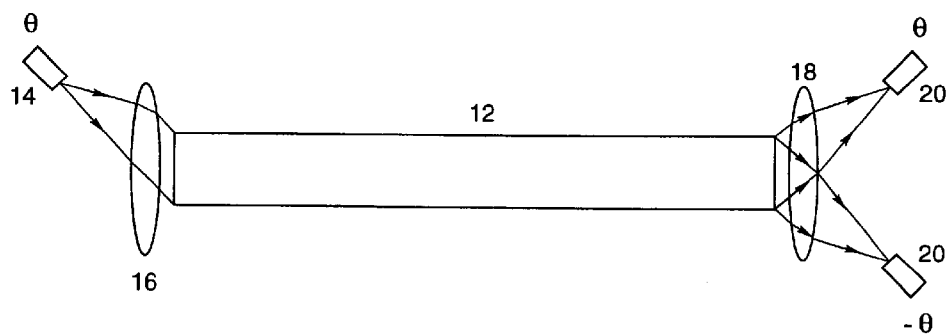
FIG. 5 depicts a side view of light from one laser diode collimated into a parallel beam and filling a slab.

The principle of mode division multiplexing is further illustrated in FIG. 5, which depicts a side view of the light from one laser diode 14 collimated into a parallel beam and filling the slab. Note that although FIG. 5 shows only one input port and one output port, similar effects occur at all the input and output ports. The light is not collimated in the in-plane direction, to insure good mixing and more-or-less uniform illumination of the detectors. The out-of-plane collimation may, for example, be performed with a cylindrical lens 16 whose axis is perpendicular to the line of laser diodes. Such a lens may, for example, be formed simply by shaping the input face of the slab. The light leaving the slab is focused by a second lens 18, either spherical or cylindrical, onto detectors 20 as a spot of size about $\lambda f/t$, where f is the focal length of the second lens, t is the thickness of the slab, and $\lambda$ is the wavelength of the light.

Figure 6:
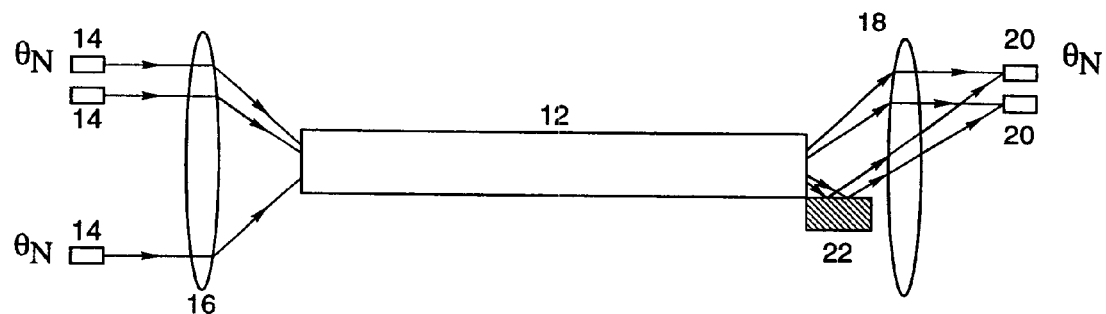
FIG. 6 depicts multiple laser diodes inputting light to a slab.

Additional laser diodes may also be arranged at angles $\theta_N$ to the plane of the slab, as illustrated schematically in side view in FIG. 6. Multiple out-of-plane modes enter and exit the slab. For clarity, only light entering one input port from three light sources and leaving through one exit port of the slab is shown. (Also note that two of the input modes are negatives of one another.) In FIG. 6 the input lens 16 has been placed one focal length away from the LEDs 14, and also approximately one focal length away from the slab 12. This configuration permits the LEDs 14 to emit light perpendicular to their plane, facilitating their fabrication on a single chip, while also collimating the emitted light in the slab. The light from each of these laser diodes propagates within the slab at an angle given by equation (1). The light then exits at angles of $\pm\theta_N$, and is focused by the output lens 18 into two lines. (The images are lines because the light is not collimated in the orthogonal direction.) As indicated in FIG. 6, a mirror 22 may be used to combine the two images for improved light collection; it is important to use all the light available, because the total light can potentially be shared among a large number of detectors. (Under certain conditions, not typical, all the light may exit on one side of the slab.)

If we take the total useful range of the focused output light as $\pm f$, then the number of resolved spots is $f/(\lambda f/t)=t/\lambda$. The number of useful modes is somewhat less, due to the necessity of providing clearance between channels and because of possible degradation of the modes during transmission through the slab. Nevertheless, for a slab a few mm thick using visible light, the number of distinct out-of-plane modes is on the order of 1000. (Note that the light in each out-of-plane mode may have several thousands of in-plane modes that are used to support a large loading.)

Figure 7:
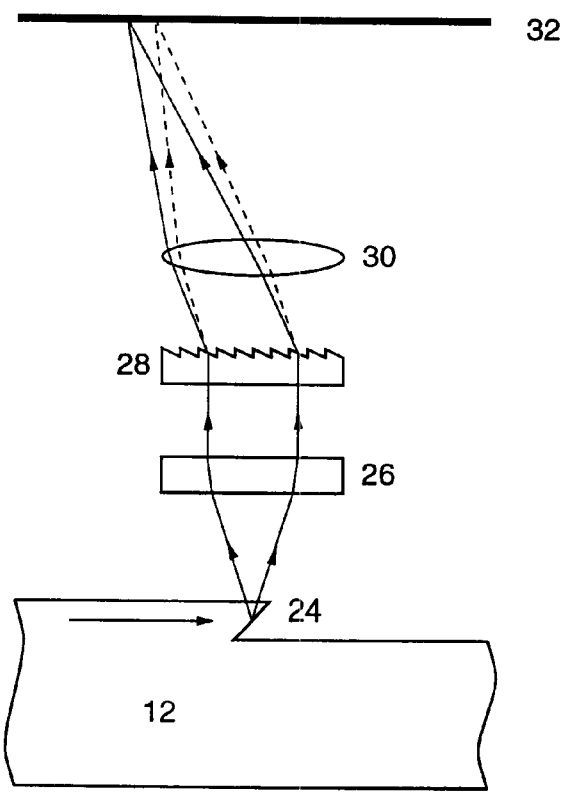
FIG. 7 depicts schematically the spatial separation of two wavelengths.
Figure 8:
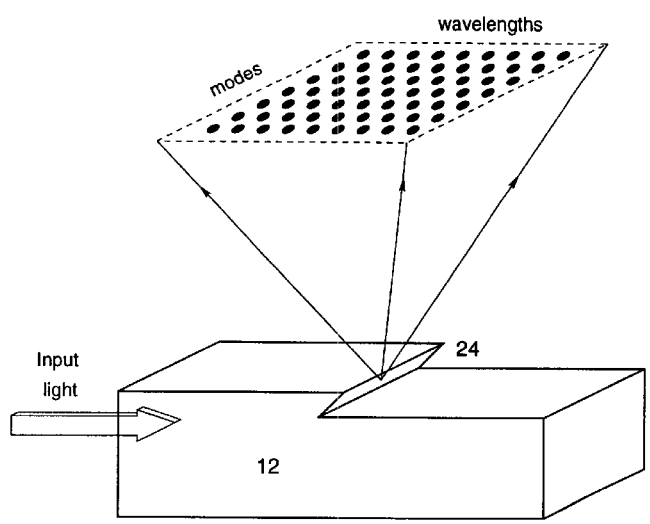
FIG. 8 illustrates schematically a two-dimensional separation of modes and wavelengths at one port of a slab.

Wavelength division multiplexing may be combined with the novel mode division multiplexing, by using sources at different wavelengths. The different wavelength signals may be directed to different detectors, for example by using dichroic mirrors which reflect some wavelengths while transmitting others. In principle this approach can be used at each of the output ports, and for each of the propagating modes, so that the total number of channels at each exit port would be the product of the number of wavelengths and the number of modes. A different approach is to use a dispersive device, such as an efficient blazed diffraction grating, to direct the different wavelengths to corresponding detectors. The latter approach is illustrated in FIG. 7, which depicts schematically the spatial separation of two wavelengths (indicated by solid and dashed lines). The light exits slab 12 at port 24, is collimated by cylindrical lens 26, separated by blazed grating 28, and focused by spherical lens 30 onto detector plane 32. In principle, combining 1000 channels of mode division multiplexing with 1000 channels of wavelength division multiplexing would result in 1000×1000=1,000,000 channels. A detector is used for each channel of interest, but multiple detectors may be arranged in an array on a single chip (or on a few chips). See FIG. 8, illustrating schematically the two-dimensional separation of modes and wavelengths at one port 24 of the slab 12.

An interesting use of the fact that inputs may be arranged at complementary negative angles, as illustrated in FIG. 6, is that since light launched from a negative input angle arrives at exactly the same outputs as light from the corresponding positive angle inputs, the configuration may be used as a permanently "built-in" digital OR function, or a permanently "built-in" analog addition function. The slab can also perform very high-speed (sub-nanosecond) ORing of a large number of inputs (around 200 is not unreasonable). Due to leakage currents and capacitive effects, such large-scale ORing is difficult to achieve electronically at comparable speeds. ORing may be performed inside the slab by mixing different inputs on the same channel. ORing may also be performed outside the slab by combining the outputs from different channels at a port optically.

The negative input angle also forms the basis for the simplest form of wavelength division and polarization division multiplexing, since it provides convenient input ports for two different wavelengths or two orthogonal polarizations.

Finally, time division multiplexing may also be used, further extending the capacity of the slab.

Plexiglas™ (poly (methyl methacrylate)) is a preferred material for first generation slab waveguides, because it may readily be patterned through lithographic means, and it has acceptable optical qualities. A wide range of other optical materials could be cast using the LIGA process as well. The invention may even be practiced with an "air slab" and reflective or semi-reflective surfaces, as discussed further below.

Prototype Experimental Results

Figure 9:
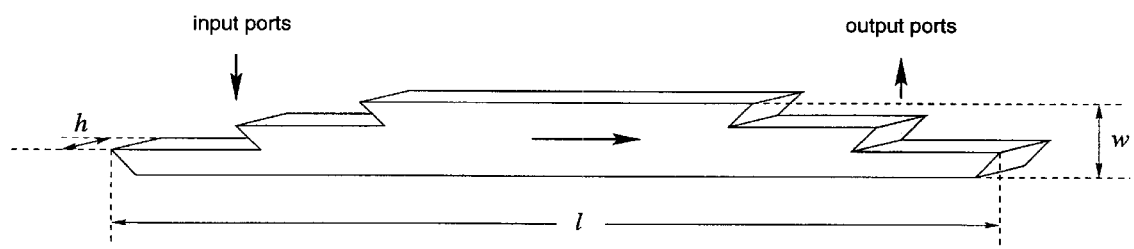
FIG. 9 illustrates a prototype slab constructed in accordance with the present invention.

We have conducted preliminary experiments on prototype "sawtooth" optical slabs machined from Plexiglas™ (poly (methyl methacrylate)) and polished. The slabs were assembled in sections 3 mm thick by 300 mm long, and had 8 input ports and 8 output ports each, generally arranged as shown in FIG. 9. The cross section of each port was 3 mm×3 mm, and the ports were spaced 25 mm apart. Sections were placed together to attain overall slab lengths of 600 nm, or 900 mm by inserting a spacer section in the middle. The separation between the input ports and the output ports varied between 200 mm and 900 mm.

The light source was a red light emitting diode (LED), operated in constant current mode. The detector was a photodiode, operated in photovoltaic mode into a resistive load under conditions that limited the output voltage to 50 mV to insure linearity. No optics were used to match the LED to the input ports, or to match the photodiode to the output ports. In future embodiments, such optics will be used. A digital voltmeter was used to perform DC measurements of the photocurrent.

Despite the fact that the optical quality of the slabs and their surface finishes were limited in the prototype embodiment, we made several instructive observations. We observed an insertion loss of approximately 10 db using uncollimated LED sources and photodetectors positioned adjacent to the ports. The losses were attributed primarily to coupling losses at the input and output ports. (In future embodiments, these losses will be reduced by, for example, collimating the input light with lenses, and by placing collecting lenses at the outputs before the detectors.) The uniformity between pairs of input and output ports was approximately ±1.5 db, i.e., the full range between the best pair and the worst pair. Additional measurements across a cross section of the slab showed that the in-plane light distribution became uniform to within a factor of 2 after just a few centimeters.

In a second experiment light from a HeNe laser beam at 6328 Å was passed through a 25 mm×300 mm×3 mm Plexiglas slab. The beam did not fill the slab. The angle by which the light was inclined to the plane of the slab was varied up to approximately 60°. The light was observed to propagate at oblique angles within the slab, and to exit at angles equal to ± the input angles, without noticeable degradation of beam quality.

More extensive measurements were performed with an "air slab," an optical slab waveguide constructed from two flat mirrors held parallel to each other at distances of 0.55 to 1.5 mm. The mirrors were about 10 cm long, and were slightly offset from one another at the ends to provide one-sided input and output ports. A He—Ne laser beam was collimated and expanded so that it just filled the 0.55 mm slab. The output was observed in the far field at a distance of 3 meters. The intensity distribution across the beam was measured by scanning across a slit in front of a photodiode. We found that: (1) Incidence angles (up to 30°) were found in which the quality of the beam after passing through the slab was virtually equivalent to that of the beam not passing through the slab. (2) At other incidence angles up to 30°, interference effects caused by beam splitting at the end of the slab degraded the beam profile, but never by more than a factor of two. (3) The transmitted light intensity decreased at higher incidence angles, evidently because of the finite reflectivity of the mirrors. This is not expected to be a significant factor for total internal reflections within a slab. (4) With a solid state laser source interference effects were suppressed at angles in which the optical path difference exceeded the coherence length of the laser.

Taken together, these observations demonstrate that with an optical slab of adequate quality, the only significant source of degradation of the optical signal is interference at the end of the slab, and that this interference amounts to a degradation of less than a factor of two from the diffraction limit.

Size-Performance Trade-Offs

There are trade-offs between the physical dimensions l, w, and h of a slab (see FIG. 9), and the values of N (number of input or output ports) and M(number of allowable modes). As the number of output ports increases, the length of the slab increases (for a fixed separation between ports), and the signal strength at each port decreases. This relation will eventually limit the bandwidth that may be used. However, a slab with more output ports has more flexibility in its applications. An increased slab length also increases the delay to the furthest port. However, under some conditions the light traveling along a longer slab may be more nearly collimated, and the total dispersion may decrease, leading to an increase in the available bandwidth.

An increase in the height of the slab permits a corresponding increase in the number of modes that may be propagated. The maximum number of channels at any port is determined by the number of separate wavelengths and angles at that port. In some cases it is desirable to have considerably fewer than the maximum number possible. In such a case, filters may be used to remove some of the channels selectively. There may be tradeoffs between large numbers of angles and large numbers of wavelengths. For example, although a square array of detectors may seem optimal, other considerations may favor fewer wavelengths and more angles—considerations such as the availability of large numbers of solid state lasers with different wavelengths, or the dispersion that is achievable with readily fabricated gratings.

Slab-Based Interconnects

The optical slab waveguide can be used generally as an interconnect in a broad range of applications, both digital and analog. As just two of many examples, a channel may correspond to a connection between pins of two integrated circuits, or a connection between different boards. Without loss of generality, the discussion below focuses on a multiprocessor setting. The principles discussed for this interconnection network may readily be translated to other structures and other environments.

The Use of a Slab as an Interconnection Network

In a digital setting, a slab waveguide with N ports, C wavelengths (colors) ($\lambda_0, \lambda_1, \ldots, \lambda_{C-1}$), and M modes ($\theta_1, \theta_2, \ldots, \theta_{M-1}$) can be modeled as a function, $f$, representing the information available at each output port of the slab. Let $b_{i,j,k}$ be the Boolean value of the bit transmitted from input port i at wavelength $\lambda_j$ and mode $\theta_k$. Then the Boolean value at wavelength $\lambda_j$ and mode $\theta_k$ at each of the N output ports $f_{j,k} + 1_{j,k} \ldots + b_{N,j,k}$, where the symbol + represents the logical OR operation. In an analog setting, the Boolean values would be replaced by continuously-valued signals, and the logical OR operation would be replaced by arithmetic addition.

Figure 10A:
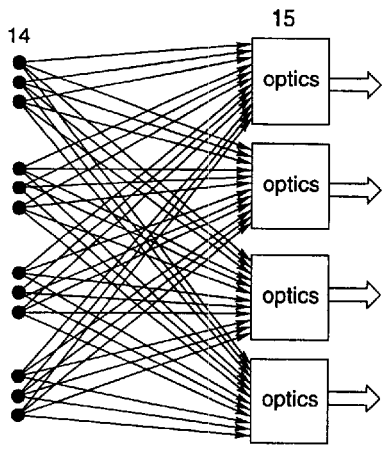
FIG. 10(*a*) illustrates schematically a slab-based interconnection network in accordance with the present invention.
Figure 10B:
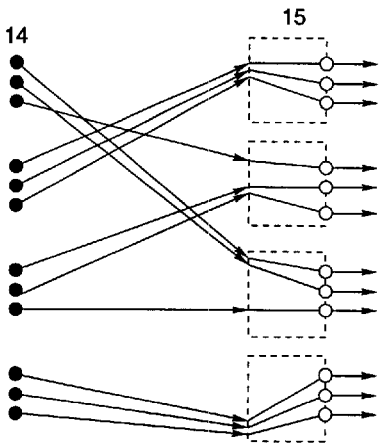
Figure 10C:
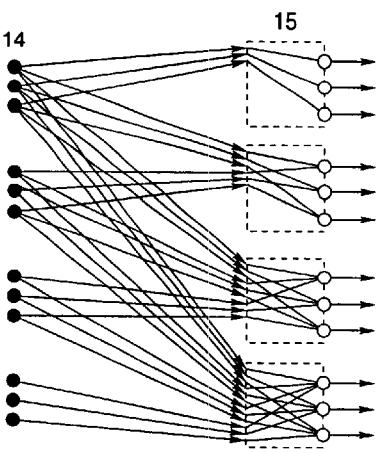

Consider the special case where no two input ports inject information having the same mode-wavelength combination. In this case, each input port is assigned MC/N channels. The slab can be viewed as broadcasting all MC input channels to all N output ports. Since each output port could use the MC bits it receives at any one time in almost any manner, the possible combinations are enormous, including one-to-one, one-to-many, many-to-one, and many-to-many, as well as combinations thereof A slab-based interconnection network can be modeled as shown schematically in FIG. 10(a), with optical elements 15 shown schematically. This figure shows all possible destinations for each light source 14. Not all these possibilities may be used, however. At each output port, a subset of the channel-array may be selected, for example using a spatial light modulator, and the resulting selected bits are imaged onto a set of detectors. In general, each output port may image selected channels independently and differently. However, several subsets of the channel-array may be selected, with each subset imaged onto a different detector; by superposition, the detector computes the logical OR of the channels imaged onto it. FIGS. 10(b) and (c) illustrate two of the numerous possible interconnection patterns, one-to-one, and many-to-many, respectively.

Optical Arrangement at Output Ports. The optical elements at the output ports of the slab play a key role in the interconnection network. In a digital setting, the role of these elements is to convert the MC bits of information available at the port at a given time into b output bits. Assume that for $0 \leq i < b$, a set $S_i$ of channels is to be imaged onto detector i.

If b=1, an optical system may be used to image all selected points onto the detector. (Observe that channels filtered out at an output port could be placed in any set.) For b>1, the following examples are presented in order of increasing complexity.

If each set $S_i$ contains all wavelengths for a given mode, then the wavelengths need not be separated. By selecting the appropriate mode (from a one dimensional channel-array) the required OR would be achieved.

If each set $S_i$ contains all modes for a given wavelength, the situation corresponds to a row (or column) of the channel-array. Imaging entire rows (or columns) while separating other rows (or columns) may be easily performed with systems of cylindrical and spherical lenses.

If the sets $S_i$ are disjoint, but each set occupies a region of adjacent elements of the channel-array, then each region can be imaged by separate optical components. The regularity of these regions is an important factor. For example, if each region is an entire row or a column, then the situation is as described earlier. On the other hand, if regions are of different sizes and shapes, then the optics could become considerably more complex.

If the sets $S_i$ are not decomposable into regions (i.e., the sets are "interleaved"), then a general solution is to implement each set at a different port, although other solutions may be more efficient, depending on the particular system.

Using appropriate optics, a spatial filter can selectively remove unwanted channels. Thus, even though a port has every channel available, there can be restrictions on which channels are actually used at a port.

The spatial filter usually comprises cells whose opacity can be controlled. Unwanted channels are mapped to opaque cells of the filter, and used channels are mapped to transparent cells. The light incident on a cell typically has a Gaussian spatial distribution. As a result, some of the light intended for one cell of the filter may "leak" onto neighboring cells. To avoid such crosstalk, it is preferred (where feasible) to assign channels so that no two "proximate" cells of the channel array are selected in the same output port of the slab. The crosstalk problem can be further amplified when several channels are imaged onto one detector. In this case, although the signal value in a particular channel may be 0, several neighboring 1's may superpose on a detector to cause it to (incorrectly) read a 1. At the same time, it will often be advantageous to place in close proximity channels that are imaged onto the same detector.

Accessing Holograms

Volume or three-dimensional holographic memories permit huge amounts of data to be stored within a small volume (in excess of $10^{12}$ bits per cm$^3$). See, e.g., D. Psaltis et al., "Holographic Data Storage," Computer, vol. 31, no. 2, pp. 52–60 (Febuary 1998). The high capacity of holographic memories is well-served by the high bandwidth and small size of the novel slab interconnect. Of particular interest is the fact that volume holographic memories store different "pages" of information that are addressable by light at different angles of incidence. The fact that a slab can make similar "mode-based" distinctions makes the slab particularly useful in addressing holographic memory devices.

Using mode division multiplexing, and placing one volume data storage hologram at each output port of a slab, one can address multiple hologram storage devices simultaneously. If each of the holograms is identical, then the data is simultaneously available to different outputs. If each of the holograms is different, then the total memory capacity is greatly increased. Alternatively, multiple holograms may be placed at one or more exit ports of the slab. Note that reconstructing data from a hologram requires a brighter source, lower bandwidth, or fewer ports than the slab would otherwise require, because many bits are retrieved simultaneously from a hologram.

Bus Arbitration

One application for the novel slab waveguides is their use in implementing very efficient bus arbitration schemes. For example, we will adapt the bus arbitration scheme of C. Subbaraman et al., "List Ranking and Graph Algorithms on the Reconfigurable Multiple Bus Machine," *Proc. Intl. Conf. Parallel Processing*, vol. II, pp. 244–247 (1993); and J. Trahan et al., "Constant Time Graph Algorithms on the Reconfigurable Multiple Bus Machine," *J. Parallel Distributed Computing*, vol. 46, pp. 1–14 (1997) to exploit the high capacity and loading of a slab bus in accordance with the present invention.

Consider a bus with N processors (or other devices) numbered $0, 1, \ldots, N-1$. Without loss of generality, assume that $N=2^k$ for some integer k. For any integer b (where $1 \leq b \leq k$), the k-bit processor addresses can be expressed in base $2^b$ simply by grouping the k address bits into $$\left\lceil \frac{k}{b} \right\rceil$$

groups, each with at most b contiguous bits. For convenience, assume that k/b is an integer. Thus the address of processor i can be written in base $2^b$ as $a_{i,1}, a_{i,2}, \ldots, a_{i,k/b}$, where for each $1 \leq j \leq k/b$, $a_{i,j}$ is the $j^{th}$ b-bit digit in the base $2^b$ representation of the address of processor i, and $a_{i,1}$ is the most significant digit.

The goal is to determine the highest-indexed processor attempting to write to the bus at a particular time. Assume that there are $2^b-1$ one-bit buses (channels) available for the arbitration process. Let these buses be indexed $1, 2, \ldots, 2^b-1$. Also assume that the OR of w or fewer bits can be determined in constant time. For a slab bus, w may be quite large.

During the first step, each processor competing for access to the bus participates in the arbitration algorithm. Let processor i be one such processor. If $a_{i,1}>0$, then this processor writes a 1 to the one-bit bus whose index is $a_{i,1}$. Several different processors may all be writing to this bus, but each will be writing a 1. Next, each competing processor i determines if there are any bus indices greater than $a_{i,1}$, for which another processor is competing. In other words, each processor i determines whether the OR of the bits in buses indexed $a_{i,1}+1, a_{i,1}+2, \ldots, 2^b-1$ equals 1. If so, processor i withdraws from the remainder of the arbitration process. A processor that finds no higher priority processor vying for the bus continues to the subsequent iteration. This step requires at most a time on the order of $2^b/w$, i.e., $O(2^b/W)$.

By applying this method to each of the k/b=(log N)/b digits of the addresses, the highest-indexed processor attempting to write to the bus may be selected.

The entire procedure runs in $$O\left(\frac{2^b \log N}{wb}\right)$$

steps. If w is of the same order as $2^b$, i.e., $w=\Theta(2^b)$, then the total time needed is $$O\left(\frac{\log N}{b}\right).$$

In addition, if $w=N^\epsilon$ for any constant $\epsilon>0$, then the time is a constant. This time is a considerable improvement over the conventional O(log N) time achieved by proceeding one address bit at a time. This $$O\left(\frac{\log N}{b}\right)-\text{time}$$

algorithm may be implemented with the novel slab bus. The large number of channels available on a single physical slab allows a large value for b, and thus a lower arbitration time.

CONCLUSIONS

The novel slab waveguides hold immense potential as high-speed, high-capacity interconnects for connecting proximate processors or other devices. Preliminary results indicate that using existing technology to implement the invention, a single slab waveguide has the potential to provide over a million independent channels (corresponding to 1000 out-of-plane modes and 1000 wavelengths). Moreover, each of these channels can receive input from around 1000 ports and can support around 1000 loads. More modest systems, with smaller waveguides and less complex optics would still provide substantial advantages in bused and other interconnection systems.

MISCELLANEOUS

The complete disclosures of all references cited in this specification are hereby incorporated by reference. In the event of an otherwise irreconcilable conflict, however, the present specification shall control. Also incorporated by reference are the entire texts of the following two references, neither of which is prior art to the present invention: M. Feldman et al., "High speed, high capacity bused interconnects using optical slab waveguides," *Proc. Workshop on Optics in Comp. Sci.*, Lecture Notes in Computer Science, vol. 1586, pp. 924–937 (1999); and M. Feldman et al., "Optical slab waveguides for massive, high-speed interconnects within a small confine," Proposal submitted to National Science Foundation (February 2000).

What is claimed is:

1. An apparatus comprising a plurality of light sources, a waveguide, at least one input port, and at least one output port; wherein:
   (a) said waveguide is adapted to transmit light received at said input ports to said output ports; wherein said waveguide comprises a first reflecting boundary and a second reflecting boundary; wherein said reflecting boundaries are adapted to reflect at least some of the light within said waveguide; such that if two input light beams are incident at different angles at the same point on either of said reflecting surfaces, then those two light beams necessarily entered said waveguide at different angles; independent of the number of times, if any, that the light beam is reflected within said waveguide;
   (b) the dimensions of said waveguide are sufficiently larger than the wavelength of the light generated by said light sources that the waveguide will simultaneously transmit a plurality of modes of light traveling at different angles;
   (c) each of said light sources is adapted to generate light that is modulated to carry information, wherein the generated light is collimated parallel to a plane;
   (d) each of said input ports is adapted to couple one or more of said light sources to said waveguide, at any selected angle within a range of angles, wherein each of said input ports preserves the separation of generated light having angles of different magnitude; and
   (e) each of said output ports is adapted to output light transmitted by said waveguide, wherein each of said output ports preserves the separation of generated light having angles of different magnitude.

2. An apparatus as recited in claim 1, comprising a plurality of said input ports and a plurality of said output ports.

3. An apparatus as recited in claim 1, additionally comprising a plurality of detectors, wherein each of said detectors senses light output at one or more angles at one of said output ports.

4. An apparatus as recited in claim 1, wherein at least one of said output ports is coupled to at least one volume hologram, wherein said volume hologram encodes different data sets that may be reconstructed by illumination at different angles, whereby a selected data set may be reconstructed by causing output light from one of said output ports to illuminate one of said holograms at an angle corresponding to the selected data set.

5. An apparatus as recited in claim 1, wherein:
   (a) said waveguide is adapted to transmit light at different wavelengths; and
   (b) said light sources are adapted, individually or collectively, to generate the collimated and modulated light at a plurality of different wavelengths.

6. An apparatus as recited in claim 1, wherein each of said light sources is adapted to modulate the light to carry information by time division multiplexing.

7. An apparatus as recited in claim 1, wherein each of said light sources is adapted to modulate the light to carry information by polarization division multiplexing.

8. An apparatus as recited in claim 1, wherein each of said light sources is adapted to modulate the light to carry digital information.

9. An apparatus as recited in claim 1, wherein each of said light sources is adapted to modulate the light to carry analog information.

10. An apparatus as recited in claim 1, wherein said waveguide has the shape of a rectangular parallelopiped, and wherein each of said ports comprises an area along a face of said rectangular parallelopiped.

11. An apparatus as recited in claim 1, wherein said waveguide has the shape of a rectangular parallelopiped folded back onto itself in an angled U shape, and wherein each of said ports comprises an area along a face of said folded rectangular parallelopiped, so that said input ports and said output ports are in spatial proximity to one another.

12. An apparatus as recited in claim 1, wherein said waveguide has the shape of a one-sided or two-sided sawtooth slab, and wherein each of said ports comprises a tooth of the sawtooth slab.

13. An apparatus as recited in claim 1, wherein said waveguide has the shape of a one-sided or two-sided sawtooth slab folded back onto itself in an angled U shape, and wherein each of said ports comprises a tooth of the sawtooth slab, so that said input ports and said output ports are in spatial proximity to one another.

14. An apparatus as recited in claim 1, wherein the dimensions of the rectangular cross-section of said waveguide are stepwise constant as a function of displacement along said waveguide.

15. An apparatus as recited in claim 1, wherein said waveguide comprises poly(methyl methacrylate).

16. An apparatus as recited in claim 1, wherein said waveguide is formed by a LIGA process.

17. An apparatus as recited in claim 1, wherein said waveguide is formed by a molding and replication process.

18. An apparatus as recited in claim 1, wherein said waveguide comprises an air space or a free-space and reflective surfaces.

19. An apparatus as recited in claim 1, wherein said light sources are adapted to spread out the generated light through a range of angles within the collimated plane, so that the light transmitted by said waveguide from any one of said light sources is provided at approximately equal intensities to each of said output ports.

20. An apparatus as recited in claim 1, wherein at least part of two surfaces of said waveguide are parallel to one another.

21. An apparatus as recited in claim 1, wherein at least two surfaces of said waveguide are parallel to one another.

22. An apparatus as recited in claim 1, wherein each cross-section through said waveguide is rectangular, disregarding said ports.

23. A combination comprising a plurality of apparatuses as recited in claim 1, wherein light from at least one output port of at least one said apparatus is coupled to the input port of another said apparatus.

24. A combination comprising an apparatus as recited in claim 1, and a plurality of electronic components, wherein said apparatus couples output from at least one of said components to input of at least one other of said components.

25. An apparatus comprising at least one light source, a waveguide, at least one input port, and a plurality of output ports; wherein:
   (a) said waveguide is adapted to transmit light received at each said input port to each said output port;
   (b) the dimensions of said waveguide are sufficiently larger than the wavelength of the light generated by said light sources that the waveguide will simultaneously transmit a plurality of modes of light traveling at different angles; each cross-section through said waveguide is rectangular, disregarding said ports; and said waveguide has the shape of a one-sided or two-sided sawtooth slab, wherein each of said ports comprises a tooth of the sawtooth slab;
   (c) each said light source is adapted to generate light that is modulated to carry information using a protocol selected from the group consisting of wavelength division multiplexing, time division multiplexing, and polarization division multiplexing; and to spread out the generated light through a range of angles so that the light transmitted by said waveguide from any one said light source is provided at approximately equal intensities to each said output port;
   (d) each said input port is adapted to couple at least one said light source to said waveguide; and
   (e) each of said output ports is adapted to output light transmitted by said waveguide.

26. An apparatus as recited in claim 25, comprising a plurality of said input ports and a plurality of said output ports.

27. An apparatus as recited in claim 25, additionally comprising a plurality of detectors, wherein each of said detectors senses light output at one or more angles by one of said output ports.

28. A method for transmitting light from at least one input port to at least one output port, said method comprising the steps of:
   (a) generating light at a plurality of light sources, wherein each light source generates light that is modulated to carry information, wherein the generated light is collimated within a plane;
   (b) transmitting the generated light from the light sources to at least one input port, wherein each input port couples light from one or more of the light sources to a waveguide, at any selected angle within a range of angles; wherein each of the input ports preserves the separation of generated light having angles of different magnitude; and wherein the dimensions of the waveguide are sufficiently larger than the wavelength of the light generated by the light sources that the waveguide will simultaneously transmit a plurality of modes of light traveling at different angles;
   (c) transmitting light through the waveguide to at least one output port, and preserving the collimation of the light entering the waveguide at the input ports; wherein the waveguide comprises a first reflecting boundary and a second reflecting boundary; wherein the reflecting boundaries reflect at least some of the light within said waveguide; such that if two input light beams are incident at different angles at the same point on either of the reflecting surfaces, then those two light beams necessarily entered the waveguide at different angles; independent of the number of times, if any, that the light beam is reflected within the waveguide; and
   (d) outputting light from each of the output ports, wherein each of the output ports preserves the separation of generated light having angles of different magnitude.

29. A method as recited in claim 28, wherein the generated light is transmitted to a plurality of input ports, and is output by a plurality of output ports.

30. A method as recited in claim 28, additionally comprising the step of detecting output light with a plurality of detectors, wherein each of the detectors senses light output at one or more angles by one of the output ports.

31. A method for transmitting light from at least one input port to a plurality of output ports, said method comprising the steps of:
   (a) generating light at a plurality of light sources, wherein each light source generates light that is modulated to carry information using a protocol selected from the group consisting of wavelength division multiplexing, time division multiplexing, and polarization division multiplexing;
   (b) transmitting the generated light from the light sources to at least one input port, wherein each input port couples light from one or more of the light sources to a waveguide, at any selected angle within a range of angles; and spreading the generated light through a range of angles, so that the light transmitted by the waveguide from any one said light source is provided at approximately equal intensities to each output port; wherein the dimensions of the waveguide are sufficiently larger than the wavelength of the light generated by the light sources that the waveguide will simultaneously transmit a plurality of modes of light traveling at different angles; wherein each cross-section through said waveguide is rectangular, disregarding the ports; and wherein the waveguide has the shape of a one-sided or two-sided sawtooth slab, wherein each of the ports comprises a tooth of the sawtooth slab;
   (c) transmitting light through the waveguide to at least one output port; and
   (d) outputting light from each of the output ports.

32. A method as recited in claim 31, wherein the generated light is transmitted to a plurality of input ports.

33. A method as recited in claim 31, additionally comprising the step of detecting output light with a plurality of detectors, wherein each of the detectors senses light output by one of the output ports.

* * * * *